United States Patent [19]

Sorensen et al.

[11] 4,380,351

[45] Apr. 19, 1983

[54] SUNROOF AIR DEFLECTOR

[75] Inventors: Norman L. Sorensen, Detroit; Lothar Pohl, Sterling Heights, both of Mich.

[73] Assignee: Wisco Corporation, Ferndale, Mich.

[21] Appl. No.: 236,895

[22] Filed: Feb. 23, 1981

[51] Int. Cl.³ .............................................. B60J 7/22
[52] U.S. Cl. ................................... 296/217; 98/2.12; 296/15
[58] Field of Search ................. 296/217, 91, 15; 98/2.11, 2.15, 2.12, 2.14

[56] References Cited

U.S. PATENT DOCUMENTS

| | | | |
|---|---|---|---|
| 3,156,175 | 11/1964 | Werner | 296/217 |
| 3,711,150 | 1/1973 | Perks | 296/217 |
| 3,727,973 | 4/1973 | Perks | 296/217 |
| 3,843,195 | 10/1974 | Lidington | 296/217 |
| 3,853,371 | 12/1974 | Buenert | 296/217 |
| 3,904,239 | 9/1975 | Jardin | 296/217 |
| 3,973,478 | 8/1976 | Gotz | 296/217 |
| 3,984,143 | 10/1976 | Vermeulen | 296/217 |
| 4,067,604 | 1/1978 | Mori | 296/217 |
| 4,081,194 | 3/1978 | Jardin | 296/15 |
| 4,142,759 | 3/1979 | Bienert | 296/217 |
| 4,142,759 | 3/1979 | Bienert | 296/217 |
| 4,175,785 | 11/1979 | Leiter | 296/214 |
| 4,291,912 | 9/1981 | Fox et al. | 296/217 |

FOREIGN PATENT DOCUMENTS 258135 11/1967 Fed. Rep. of Germany ...... 296/217

Primary Examiner—Richard A. Bertsch
Attorney, Agent, or Firm—Basile, Weintraub & Hanlon

[57] ABSTRACT

An air deflector for a vehicle having a roof opening and a sliding panel to open and close the opening. The sunroof includes a frame around the opening with a pair of opposed longitudinal edges having inward projecting recessed ledges to support the panel flush with the roof. A front transverse edge includes an inward projecting front ledge recessed below the panel. A pair of spaced apart hinges are hinged at a lower end to the front ledge, and the hinges are movable from a retracted position abutting the front ledge to a deployed position with the hinges extending forward and upward. An upper end of the hinge extends above the roof in the deployed position and is attached to the air deflector which extends across the roof opening. A biasing spring urges the air deflector to the deployed position when the panel is open. A forward sliding of the panel urges the air deflector into a recess formed in the front inward projecting ledge allowing the panel to pass over the air deflector and close the opening.

6 Claims, 5 Drawing Figures

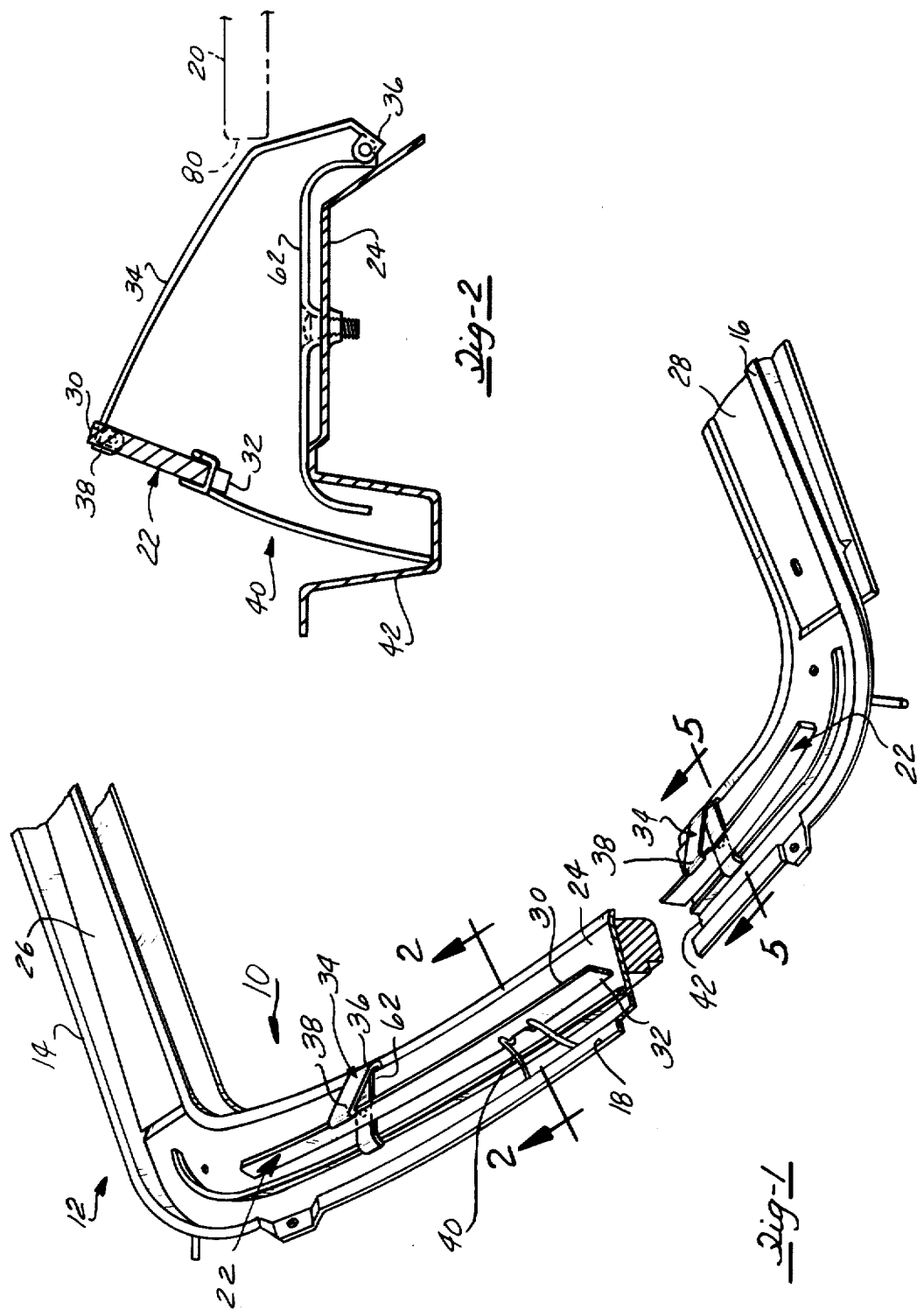

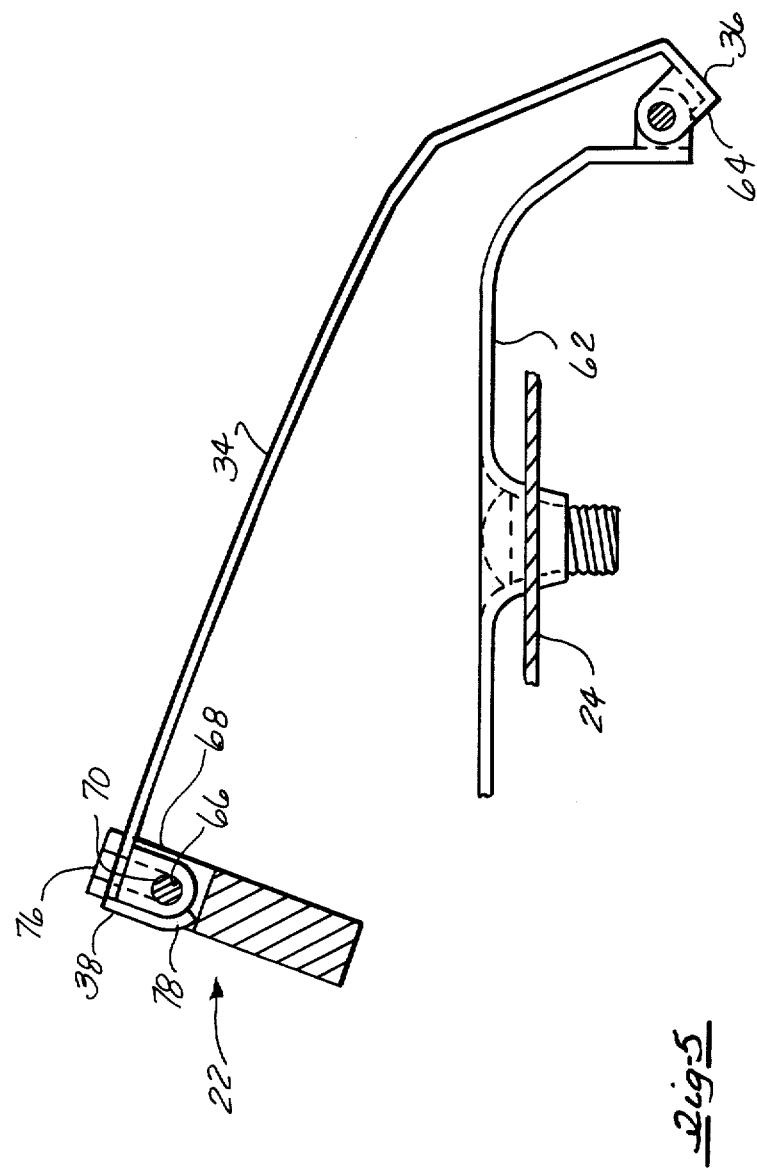

SUNROOF AIR DEFLECTOR

BACKGROUND OF THE INVENTION

1. Field of the Invention

The present invention generally relates to the field of vehicles having a sunroof opening formed over the passenger compartment and, in particular, the present invention is concerned with vehicles having a sunroof opening and a sliding panel to selectively open and close the opening and a retractable air deflector that is deployed above the front edge of the opening when the panel is slid to the open position.

2. Description of the Prior Art

Open sunroofs commonly experience wind noise when the vehicle is moving at high speed. Sunroofs that employ a sliding panel to open and close the opening are particularly susceptible to an annoying wind noise. Air deflectors positioned along the front edge of the vehicle opening to correct the wind noise problem are known. Air deflectors that are automatically deployed when the panel is opened and automatically retracted when the panel is closed also are known. Automatically deployed air deflectors in the art are supported by arms hinged to the longitudinal sides of the opening with the arms biased toward the deployed position. Sliding of the panel toward the front of the vehicle depresses the arms to the retracted position allowing the opening to be closed. Examples of air deflectors for sunroofs having a sliding panel in the prior art are disclosed in U.S. Pat. Nos. 3,156,175; 3,711,150; 3,727,973; 3,843,195; 3,853,371; 3,904,239; 3,973,478; 3,984,143; 4,067,604; 4,081,194; 4,142,759; 4,175,785; and West German Pat. No. 258135. These patents are relevant to the Applicants' invention in that they represent the closest prior art for utilizing the sliding motion of a sunroof panel to deploy and retract an air deflector.

SUMMARY OF THE INVENTION

The present invention, which will be described in greater detail hereinafter, comprises an air deflector for a vehicle having a roof opening and a sliding panel to open and close the opening. The sunroof includes a frame around the opening having a pair of opposed longitudinal edges with inward projecing recessed ledges to support the panel flush with the roof, and a front transverse edge with an inward projecting front ledge recessed below the panel. A pair of spaced apart hinges are hinged at a lower end to the front ledge and are movable from a retracted position abutting the front ledge to a deployed position with the hinges extending forward and upward and having an upper end extending above the roof. The air deflector extends across the roof opening and is supported along an upper edge by the upper ends of the hinges. The air deflector is movable with the hinges between the deployed position above the roof and the retracted position nested within a transverse channel formed in a forward portion of the front ledge. A biasing device is employed to urge the deflector to the deployed position, and forward sliding of the panel toward the closed position causes a forward edge of the panel to abut the hinges urging the air deflector to the retracted position allowing the panel to pass over the deflector to the closed position.

It is therefore a primary object of the present invention to provide a new and improved air deflector for sunroof systems having a sliding panel to open and close the opening.

It is a further object of the present invention to provide such an air deflector that can be readily attached to the front edge of a frame surrounding the sunroof opening.

It is yet another object of the present invention to provide a sunroof air deflector that is economical to manufacture, easy to install, and reliable in its operation.

Further objects, advantages, and applications of the present invention will become apparent to those skilled in the art of vehicle sunroofs when the accompanying description of one example of the best mode contemplated for practicing the invention is read in conjunction with the accompanying drawing.

BRIEF DESCRIPTION OF THE DRAWING

In the drawing like numbers to like parts throughout the several views and wherein;

FIG. 1 illustrates a broken, perspective view of the sunroof frame and air deflector of the present invention;

FIG. 2 illustrates a cross-sectional view of the air deflector of FIG. 1 in the deployed position taken along the line 2—2 of FIG. 1;

FIG. 5 illustrates an enlarged cross-sectional view of the hinge and air deflector of FIG. 1 taken along the line 5—5 of FIG. 1. and

DESCRIPTION OF THE PREFERRED EMBODIMENT

Figure 3:
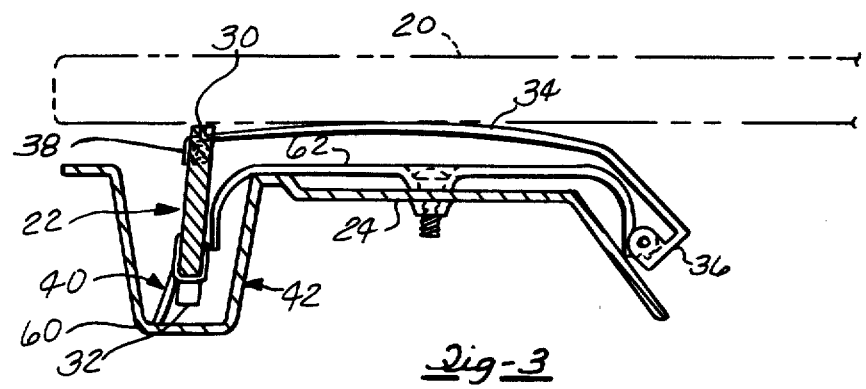
FIG. 3 is the air deflector of FIG. 2 shown in the retracted position.

Referring now to the drawing, and in particular FIG. 1, there is illustrated at 10 a sunroof for a motor vehicle having an opening formed in the roof thereof. A frame 12 is provided around the perimeter of the opening having longitudinally extending edges 14, 16 and front and rear transverse edges 18. The sunroof 10 further includes a slidable roof panel 20 (FIGS. 2 and 3) movable between a closed position closing the opening and an open position. An air deflector 22 extends across the front of the opening and is movable from a deployed position above the roof of the vehicle as shown in FIG. 2 to a retracted position as shown in FIG. 3.

The frame 12 includes a recessed front inward extending transverse ledge 24 and a pair of opposed longitudinal inward extending ledges 26, 28 to support the panel 20 flush with the vehicle roof. The air deflector 22 includes an upper edge 30 and a lower edge 32, and is supported by at least one and preferably a pair of hinges 34 hingedly attached at a lower end 36 to the front ledge 24 and hingedly attached at an upper end 38 to the air deflector upper edge 30, as shown in FIG. 2. A biasing means 40, which will be described subsequently in greater detail, is provided for biasing the air deflector 22 in a deployed position above the panel when the panel is in the opened position. The air deflector 22 is automatically retracted to the retracted position as shown in FIG. 3 of the drawing when the panel 20 is moved to the closed position as described hereinbelow.

Figure 4:
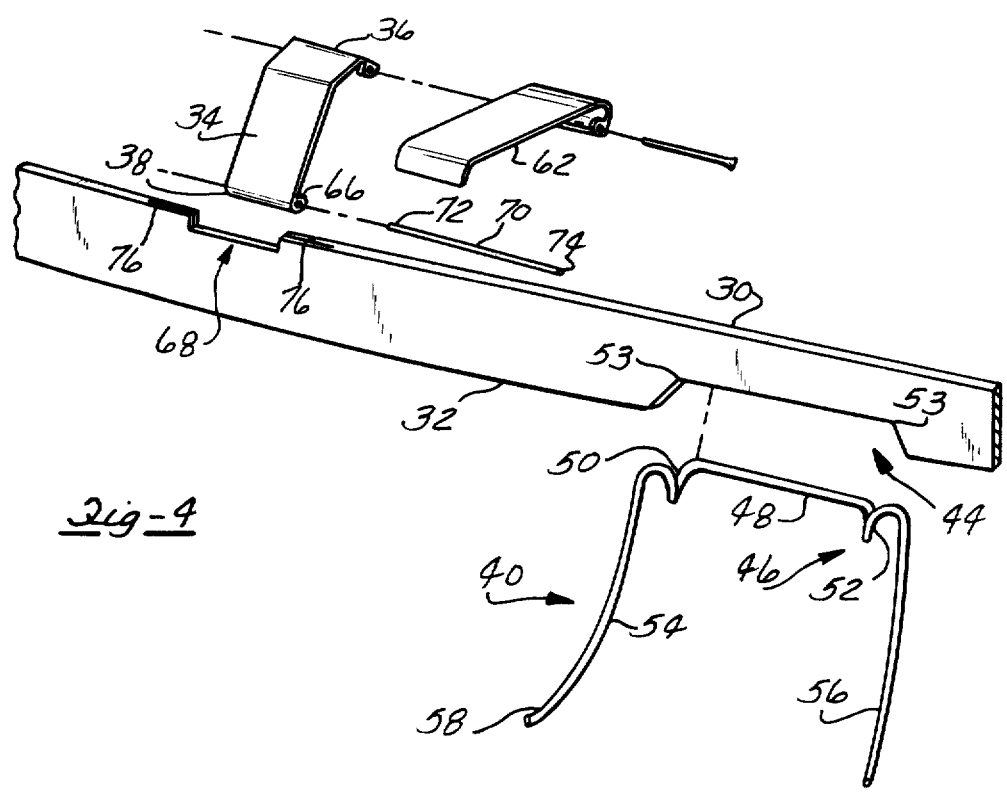
FIG. 4 illustrates a broken, perspective, exploded view of the air deflector, hinge, and biasing spring of FIG. 1; and;.

A transverse channel 42 is formed in the front ledge 24 and is adapted to nestingly receive the air deflector in the retracted position. In the preferred embodiment, the biasing means 40 (FIG. 4) for biasing the air deflector to the deployed position comprises a spring retaining notch 44 formed along the lower edge 32 preferably at a central portion of the air deflector 22. A wire spring 46 is adapted to engage the spring retaining notch 44 and comprises a central horizontal portion 48 positioned above the notch 44. A pair of opposed loops 50, 52 are formed at the ends of the central horizontal portion 48 extending downward then curving forward then upward to snugly embrace the notch 44 at the inside corners 53 thereof. The opposed loops 50, 52 then curve arcuately outward then extend downward linearly to define a pair of opposed legs 54, 56. The opposed legs 54, 56 extend moderately forward and outward and terminate at an outward curved end 58. The outward curve ends 58 abut a forward corner 60 of the transverse channel 42 causing an outward spreading of the opposed legs 54, 56 and an upward and forward biasing of the air deflector 22 toward the deployed position as shown in FIG. 2 of the drawing.

As can be best shown in FIG. 5 of the drawing, the preferred embodiment includes a hinge support 62 secured to the front ledge 24 with the hinge support 62 hinged to the hinge lower end 36. A lower stop 64 is formed on the hinge lower end 36 and is configured to selectively abut the hinge support 62 and limit the upward movement of the hinge upper end 38. The hinge upper end includes a pair of transversely aligned apertures 66. A hinge notch 68 is formed in the upper edge 30 to slidingly receive the hinge upper end 38, and a hinge pin 70 is adapted to be slidingly supported by the transversely aligned apertures 66 with a pair of pin opposed ends 72, 74 (FIG. 4) projecting from the aligned apertures 66. A pin receiving groove 76 is formed along the upper edge 30 adjacent the ends of the hinge notch 68 to securely receive the pin opposed ends 72, 74 securing the upper edge to the hinge upper end 38. The hinge upper end 38 includes an upper stop 78 formed integrally therewith to selectively abut an edge of the hinge notch 68 and limit the forward movement of the air deflector lower edge 32. The lower stop 64 limiting the upward movement of the hinge upper end 38 and the upper stop 78 limiting the forward movement of the air deflector lower edge 32 defines the air deflector deployed position.

As illustrated in FIG. 2 of the drawing, the hinge 34 in the deployed position extends forward and upward from its point of attachment to the front ledge 24 when the panel 20 is opened. The slidable roof panel 20 is adapted to slide forward to the closed position, and as the panel approaches the closed position a front edge 80 of the panel 20 abuts the hinge 34 and movement of the panel to the closed position urges the air deflector 22 into the transverse channel 42 against the biasing means 40 to achieve the retracted position.

It can thus be seen that the present invention has provided a new and improved retractable air deflector for vehicle sunroofs employing a sliding panel to open and close the sunroof opening.

It would be obvious to the skilled artisan that other biasing means such as leaf springs, torsion springs, or the like could be used to bias the air deflector to the deployed position. It should also be understood by those skilled in the art of vehicle sunroofs that other forms of the Applicants' invention may be had, all coming within the spirit of the invention and the scope of the appended claims.

Having thus described our invention, what we claim is:

1. In a motor vehicle having an opening formed in a roof thereof, a frame around the perimeter of the opening defining longitudinally extending edges and front and rear transverse edges, the vehicle further having a slidable roof panel movable between a closed position closing the opening and an open position opening the opening, the improvement comprising:
   an air deflector having an upper edge and a lower edge extending across the front transverse edge, said air deflector being movable from a deployed position above the roof to a retracted position;
   the frame including a recessed front inward extending transverse ledge and a pair of opposed longitudinal inward extending ledges to support the panelflush with the roof;
   hinge means for hingingly supporting said air deflector for substantially linear movement between said retracted and deployed positions, said hinge means hingedly attached at a lower end to said front inward extending ledge and at an upper end to said air deflector upper end;
   means for biasing said air deflector in the deployed position above the panel when the panel is in the open position; and
   means for automatically retracting said air deflector to the retracted position when the panel is moved to the closed position.

2. The air deflector as defined in claim 1 further comprising;
   a transverse channel formed in said front inward extending ledge; and
   said air deflector nestingly engageable with the transverse channel.

3. The air deflector as defined in claim 2 wherein the means for biasing said air deflector in the deployed position comprises:
   a spring retaining notch formed along said lower edge;
   a wire spring engaging said spring retaining notch comprising a central horizontal portion positioned above the notch, a pair of opposed loops formed at the ends of the central horizontal portion extending downward then curving forward then upward to snugly embrace the notch at the inside corners thereof, said opposed loops then curving arcuately outward then extending downward linearly to define a pair of opposed legs, said opposed legs extending moderately forward and outward terminating at an outward curved end; and
   said outward curved ends biased against a forward corner of said transverse channel causing an outward spreading of said opposed legs and an upward and forward biasing of said air deflector toward the deployed position.

4. In a motor vehicle having an opening formed in a roof thereof, a frame around the perimeter of the opening defining longitudinally extending edges and front and rear transverse edges, a slidable roof panel movable between a closed position closing the opening and an open position opening the opening, the improvement comprising:
   an air deflector having an upper edge and a lower edge extending across the front transverse edge, said air deflector being movable from a deployed position above the roof to a retracted position;
   the frame including a recessed front inward extending transverse ledge and a pair of opposed longitudinal inward extending ledges to support the panel flush with the roof; the frame further including a transverse channel formed in said front inward extending ledge, said air deflector being nestingly engageable with said transverse channel;

said air deflector being supported by a hinge, said hinge being hingedly attached at a lower end to said front inward extending ledge, and at an upper end to said air deflector upper end;

means for biasing said air deflector in the deployed position above the panel when the panel is in the open position; said biasing means including:

a spring retaining notch formed along said lower edge;

a wire spring engaging said spring retaining notch comprising a central horizontal portion positioned above the notch, a pair of opposed loops formed at the ends of the central horizontal portion extending downward then curving forward then upward to snugly embrace the notch at the inside corners thereof, said opposed loops then curving arcuately outward then extending downward linearly to define a pair of opposed legs, said opposed legs extending moderately forward and outward terminating at an outward curved end; and said outward curved ends biased against a forward corner of said transverse channel causing an outward spreading of said opposed legs and an upward and forward biasing of said air deflector toward the deployed position;

a hinge support secured to the front inward extending ledge;

said hinge support hinged to said hinge lower end;

a lower stop formed on said hinge lower end, said lower stop selectively abutting said hinge support limiting the upward movement of said hinge upper end;

a pair of transversely aligned apertures formed in said hinge upper end;

a hinge notch formed in said upper edge to slidingly received said hinge upper end;

a hinge notch formed in said upper edge to slidingly receive said hinge upper end;

a hinge pin slidingly supported by said transversely aligned apertures with a pair of pin opposed ends projecting transversely from said aligned apertures;

a pin receiving groove formed along said upper edge to securely receive said pin opposed ends hingedly securing said upper edge to said hinge upper end;

said hinge upper end including an upper stop formed integrally therewith selectively abutting an edge of said hinge notch limiting the forward movement of said deflector lower edge; and whereby said lower stop limiting the upward movement of said hinge upper end and said upper stop limiting the forward movement of said air deflector lower edge defines the air deflector deployed position; and means for automatically retracting said air deflector to the retracted position when the panel is moved to the closed position.

5. The air deflector as defined in claim 4 wherein the means for automatically retracting the air deflector to the retracted position when the panel is moved to the closed position comprises:

said hinge in the deployed position extending forward and upward with said upper end positioned above the roof;

the slidable roof panel adapted to slide forward to the closed position;

a front edge of the roof panel abutting said hinge as the panel nears the closed position; and movement of the panel to the closed position urging said air deflector into said transverse channel against said biasing means.

6. An air deflector for a vehicle having a roof opening and a sliding panel to open and close the opening comprising:

a frame around the opening having a pair of opposed longitudinal edges with inward projecting recessed ledges to support the panel and a front transverse edge with an inward projecting front ledge recessed below the panel;

a pair of spaced apart hinges hinged at a lower end to said front ledge;

said hinges being movable from a retracted position abutting said front ledge to a deployed position with the hinges extending forward and upward with an upper end extending above the roof;

means for biasing said hinges toward the deployed position;

the air deflector extending across the roof opening and including an upper edge;

said hinge upper ends affixed to the upper edge to support the air deflector, with the air deflector being movable with said hinges between the deployed position above the roof and the retracted position;

a transverse channel formed in a forward portion of said front ledge to nestingly receive the air deflector in the retracted position;

and whereby forward sliding of the panel toward the closed position causes a forward edge of the panel to abut said hinges with further forward sliding of the panel moving the upper end of said hinges and the air deflector downward to the retracted position.

* * * * *